United States Patent [19]

Saadeh

[11] Patent Number: 5,828,207
[45] Date of Patent: Oct. 27, 1998

[54] HOLD-UP CIRCUIT WITH SAFETY DISCHARGE FOR PREVENTING SHUT-DOWN BY MOMENTARY POWER INTERRUPTION

[75] Inventor: Tobia Saadeh, College Park, Md.

[73] Assignee: The United States of America as represented by the Secretary of the Navy, Washington, D.C.

[21] Appl. No.: 49,463

[22] Filed: Apr. 20, 1993

[51] Int. Cl.⁶ .................................. G05F 1/40; H02J 7/00
[52] U.S. Cl. .............................. 323/281; 307/66; 361/92
[58] Field of Search ................... 307/64–66, 48; 323/268–69, 272–74, 280–81; 361/154, 160, 187, 86, 92, 91, 15–18

[56] References Cited

U.S. PATENT DOCUMENTS

| | | | |
|---|---|---|---|
| 4,709,320 | 11/1987 | Konopka | 363/56 |
| 4,771,356 | 9/1988 | Hastings | 361/59 |
| 4,819,116 | 4/1989 | Piteo | 361/18 |
| 5,140,511 | 8/1992 | Lee et al. | 363/21 |
| 5,153,497 | 10/1992 | Eiden | 320/61 |
| 5,161,097 | 11/1992 | Ikeda | 363/124 |

*Primary Examiner*—Stuart N. Hecker
*Attorney, Agent, or Firm*—James B. Bechtel, Esq.

[57] ABSTRACT

A storage capacitor of a hold-up circuit is connected by a resistor to the current conducting bus supplying operating voltage to computer hardware from a power source. The capacitor is thereby charged to the operating voltage level in order to subsequently maintain computer operation by discharge through a diode during power interruption of a relatively long duration determined by the capacitor charge and a predetermined drop in voltage applied to the computer load causing its shutdown. Detection of such drop in voltage is operative through an opto-isolator to safely discharge the capacitor by relay controlled grounding thereof.

12 Claims, 2 Drawing Sheets

HOLD-UP CIRCUIT WITH SAFETY DISCHARGE FOR PREVENTING SHUT-DOWN BY MOMENTARY POWER INTERRUPTION

BACKGROUND OF THE INVENTION

This invention relates generally to controlling power shut-down of electronic equipment so as to avoid frequent reload because of momentary power interruptions.

Heretofore, shutdown of electronic equipment such as computer hardware has been caused by power interruption of very short duration, exceeding 3.8 milliseconds for example. Such computer shutdown, resulting from a power tolerance interrupt, has required reload of the computer program involving operator intervention, loss of historical data and associated problems.

In an effort to reduce the frequency of the aforementioned equipment shutdown, it has been proposed to increase the duration of equipment operation during power interruption by supply of stored energy from a hold-up circuit. Such proposed increase in the hold-up duration of equipment operation must obviously be accommodated by the charging of a capacitor in the hold-up circuit to a higher voltage. However hold-up circuits under such increased power storage demand, retain a high storage voltage when equipment shutdown does occur, thereby exposing maintenance personnel to hazardous conditions.

It is therefore an important object of the present invention to provide a hold-up circuit for use on a stand-by basis to maintain operation of electronic equipment during momentary power interruptions of a longer duration, without the problems heretofore experienced because of the relatively high residue storage voltage in the hold-up circuit when shutdown occurs.

SUMMARY OF THE INVENTION

In accordance with the present invention, impedance in the form of resistor and diode within the hold-up circuit is introduced to regulate charge and limit discharge of its power storing capacitor under control of a safety control circuit which is automatically responsive to a drop in the voltage applied to equipment, such as computer hardware, from its power source below a level at which shutdown occurs. The safety control circuit, in accordance with one embodiment of the invention, includes an opto-isolator controlled relay connected to a voltage level sensing circuit through which a predetermined drop in voltage from the power source to the equipment load, substantially below the normal load operating level, is detected to direct continued discharge of the power storing capacitor to ground in a safe manner upon expiration of a longer power source interrupt interval before shut-down occurs.

BRIEF DESCRIPTION OF DRAWING FIGURES

Other objects, advantages and novel features of the invention will become apparent from the following detailed description of the invention when considered in conjunction with the accompanying drawing wherein.

DETAILED DESCRIPTION OF PREFERRED EMBODIMENT

Figure 1:
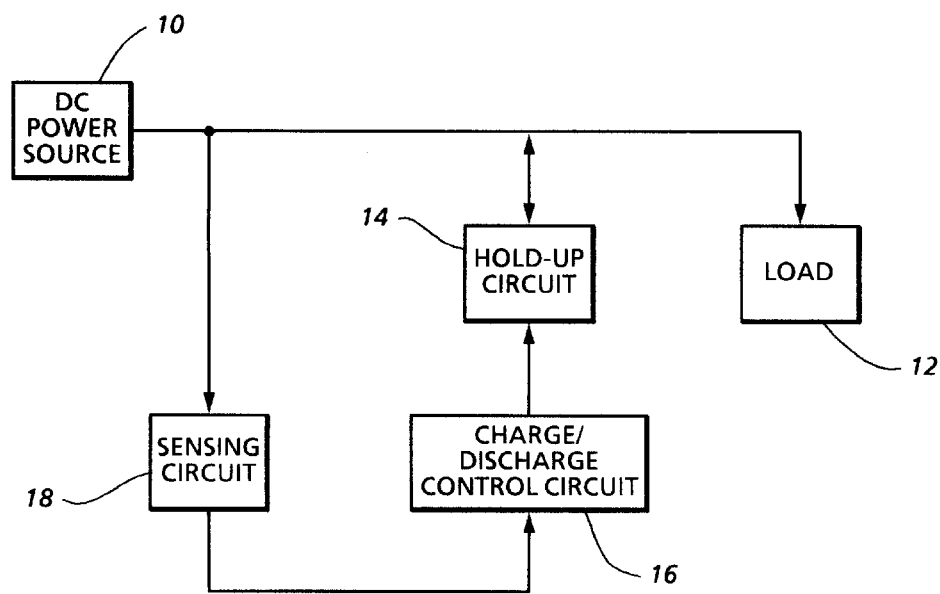
FIG. 1 is a block diagram schematically depicting a typical installation of the present invention.

Referring now to the drawing in detail, FIG. 1 diagrams a DC power source 10 through which voltage at an operating level is applied to a load 12 for operation thereof. The load according to one embodiment is an electronic computer to which dc voltage of sufficient magnitude must be applied and maintained in order to support proper operation. A hold-up circuit, generally referred to by reference numeral 14, is interconnected with the power source 10 and load 12 as depicted in FIG. 1 in order to maintain operation of the load during momentary power interruptions at the source 10. In accordance with the present invention, the maximum power interruption interval beyond which equipment shut-down occurs is prolonged by the hold-up circuit 14 for as long as 150 milliseconds, by control over its charging and discharging operation through control circuit 16, connected to a sensing circuit 18 detecting a drop in the voltage applied to load 12 below a predetermined operational level.

Figure 2:
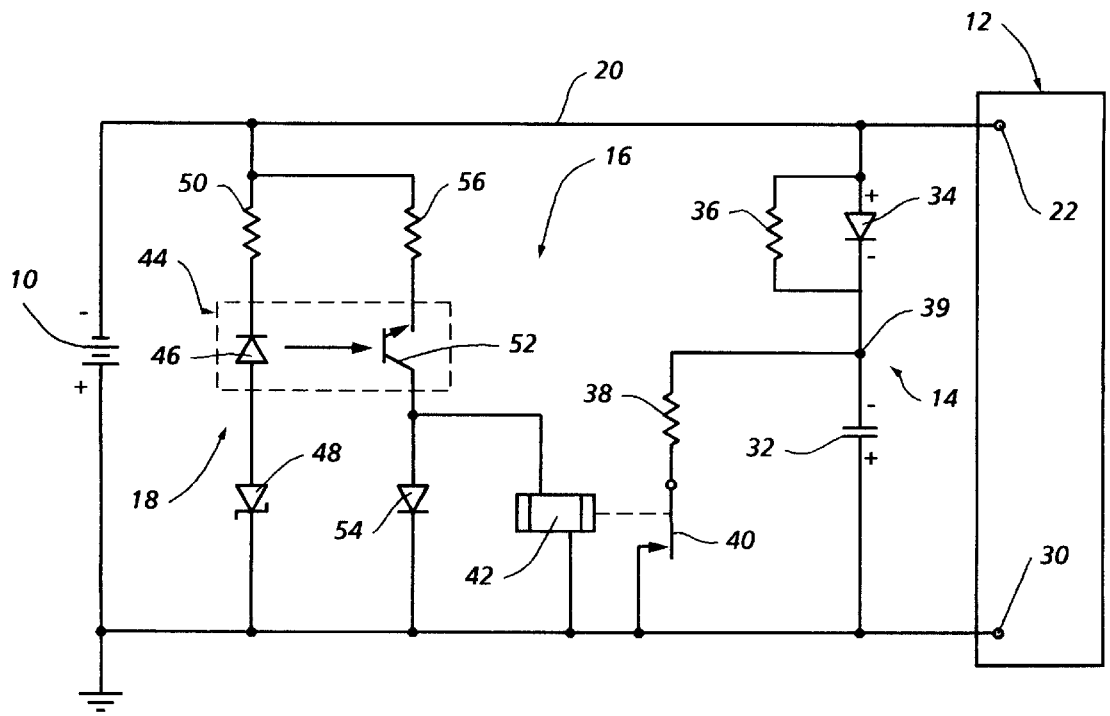
FIG. 2 is a more detailed diagram of the circuit arrangement associated with the installation depicted in FIG. 1.

As shown in FIG. 2, the power source 10 is schematically represented as a dc battery having a positive terminal connected to ground and a negative terminal connected to a −150 VDC voltage supply 20. A computer system represented as a load 12, has a negative voltage input terminal 22 to which 20 is connected and a positive ground terminal 30. The hold-up circuit 14 is connected between the operating voltage supply bus 20 and positive ground.

With continued reference to FIG. 2, the hold-up circuit 14 includes electrolytic capacitor 32 connected by diode 34 to the dc voltage supply voltage 20. The diode 34 is directionally arranged as shown to discharge the capacitor 32 into the voltage 20 during momentary power interruption of the source 10 so as to continue the supply of operating voltage to the input terminal 22 of the load preventing shut-down thereof. The energy stored in capacitor 32 for such purpose is effected by charging thereof during normal powered operation of the load through current limiting resistor 36 connected in parallel with the diode 34. Full charging of capacitor to the operating voltage level of the voltage 20 is thereby effected within a charging cycle of approximately two minutes according to one embodiment of the invention.

In view of the relatively high residue voltage remaining stored in the capacitor 32 when load shutdown occurs after prolonged power interruption, the junction 39 between the capacitor 32 and the diode 34 is connected to ground through a by-pass resistor 38 and a normally closed relay switch 40 of the control circuit 16. The relay switch 40 is however opened by energization of relay coil 42, as diagrammatically represented in FIG. 2, to prevent capacitor grounding during normal powered operation of load 12. Toward that end, the voltage level sensing circuit 18 is provided with an opto-isolator device 44 having a light emitting diode 46 connected in series with a zener diode 48 and a resistor 50 between the voltage 20 and ground. The light emitting diode 46 of the opto-isolator 44 is accordingly rendered conductive by reverse bias of zener diode 48 during normal powered operation of load 12 to switch on transistor 52 in the forming part of the control circuit 16. The transistor 52 in the control circuit is connected in series with diode 54 and resistor 56 between bus 20 and ground to maintain the relay coil 42 energized and its switch 40 open. When the dc voltage 20 drops below a predetermined level at which load shutdown occurs, such drop is detected by turn-off of zener diode 48 to switch-off transistor 52 of the opto-isolator 44 thereby deenergizing the relay coil 42 and effect continued discharge of the capacitor 32 in by-pass relation to the load by capacitor grounding through resistor 38 upon closing of relay switch 40. The drop in voltage in bus 20 to predetermined level of −91 Vdc occurs upon elapse of 150 ms following power interruption at source 10, according to the described embodiment of the invention.

Figure 3:
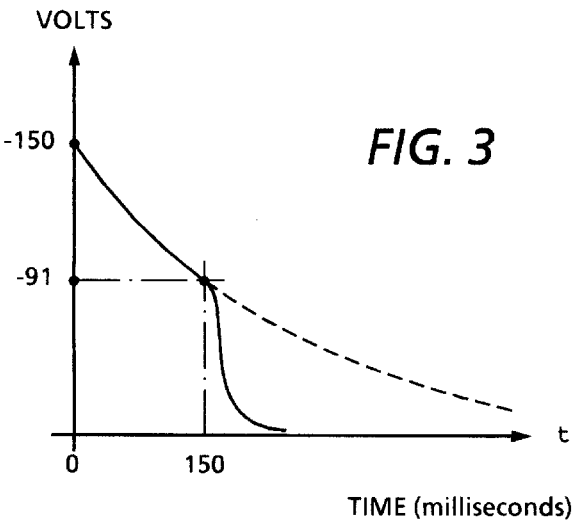
FIG. 3 is a graph illustrating a hold-up circuit operational characteristic in accordance with the present invention.

It will be apparent from the foregoing description that charge of the capacitor 32 in the hold-up circuit 14 is regulated by resistor 36 while the aforementioned −150 Vdc operating voltage level is applied to bus 20 for supporting normal operation of load 12. When the supply of the −150 Vdc voltage by source 10 is interrupted, the capacitor 32 begins to discharge into the bus 20 through diode 34 from its −150 Vdc storage voltage level ($V_L$) as indicated by curve 56 in FIG. 3. Upon elapse of 150 millisecond interval, the sensing circuit 18 is operative to detect the predetermined voltage drop 20 below the −91 Vdc level (Vz) of zener diode 48, as denoted by point 57 in FIG. 3, to thereby trigger operation of the control circuit 16 through its power relay. As long as the voltage supply 20 is above the −91 Vdc zener diode level (Vz), the relay switch 40 of the circuit 16 remains open to maintain the hold-up circuit 14 in a back-up mode. In such back-up mode, the capacitor 32 either remains fully charged or is activated to discharge into the load through diode 34 during the 150 ms interval as reflected by curve 56 in FIG. 3 to maintain operation of the load. Thereafter, the residue storage voltage in capacitor 32 rapidly drops by discharge to ground through resistor 38 as reflected by curve 56 in contrast to the otherwise slower continued discharge reflected by the dotted line curve extending from point 57 in FIG. 3.

Figure 4:
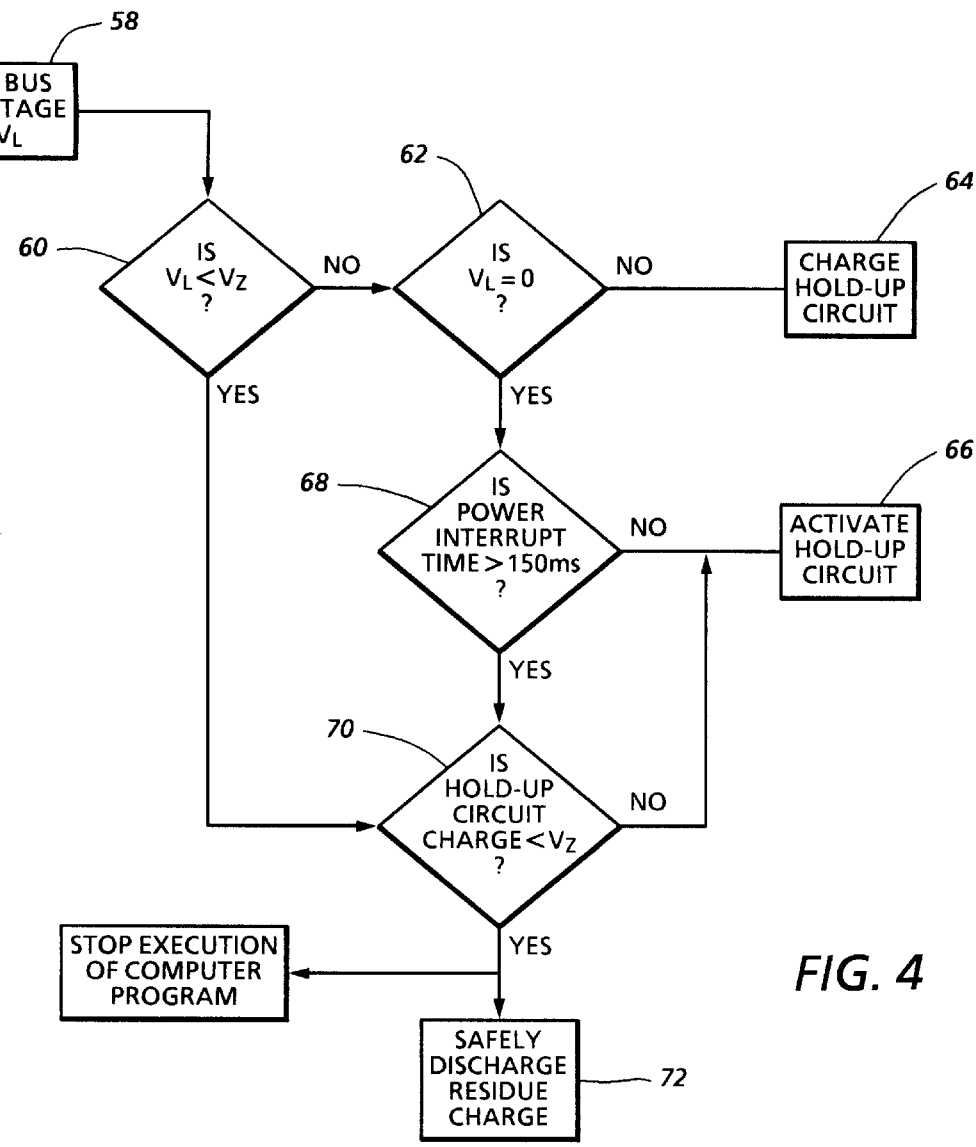
FIG. 4 is a block diagram depicting the operational program associated with the present invention.

Operation of the hold-up circuit 14 as hereinbefore described follows the program depicted in the block diagram of FIG. 4, denoting the normal −150 Vdc voltage level ($V_L$) in bus 20 by block 58. During the initial turn-on of the load by such operating voltage ($V_L$) above the −91 Vdc zener diode voltage (Vz), as reflected in program block 60, the opto-isolator device 44 conducts to open relay switch 40. As long as the power source 10 is on, as reflected in program block 62, the hold-up circuit capacitor 32 is charged as denoted by block 64 during a charging cycle of approximately two minutes through resistor 36, which determines the magnitude of the charging current.

If an interruption in power occurs as also reflected in by block 62 of FIG. 4, the holding circuit capacitor 32 previously fully charged to the −150 Vdc voltage level ($V_L$) will discharge through forward biased diode 34 of the activated hold-up circuit 16 as denoted by block 66, as long as the power interruption interval is less than 150 milliseconds as denoted in block 68. In such operational stage, the voltage applied to zener diode 48 is above the −91 Vdc voltage level (Vz) but is rapidly dropping thereto as reflected by curve 56 in FIG. 3, while the relay switch 40 is open to support operation of the load 12. When the charge in the hold-up circuit capacitor 32 drops below the −91 Vdc level (Vz) of the zener diode 48, after elapse of the 150 ms interval as reflected in block 70, the residue charge in capacitor 32 is safely discharged to ground through resistor 38 and relay switch 40, as reflected by block 72. At the same time, load operation (such as computer program execution) is then terminated as reflected by block 74 in FIG. 4.

Numerous other modifications and variations of the present invention are possible in light of the foregoing teachings. It is therefore to be understood that within the scope of the appended claims the invention may be practiced otherwise than as specifically described.

What is claimed is:

1. In combination with a source of power, an electrical load connected to the source for operation at an operating voltage above a predetermined level, hold-up circuit means for maintaining said operation of the load during momentary interruption in power of the source, comprising: power storage means connected to the load for supply of said operating voltage thereto, impedance means connected to the power storage means for regulating charge thereof and discharge thereof into the load during said interruption in power of the source and safety means responsive to a drop in voltage applied to the load from the source below said predetermined level for preventing continuation of said discharge of the power storage means into the load during said interruption in power of the source.

2. The combination of claim 1 wherein said safety means comprises sensing means connected to the load for detection of said drop in the voltage below the predetermined level and relay means responsive to said detection of the drop in the voltage for by-passing the load during said discharge of the power storage means.

3. The combination of claim 2 wherein said sensing means comprises opto-isolator means connected to the source for energizing the relay means to enable said charge of the storage means and zener diode means connected in series with the opto-isolator means to the source for deenergizing the relay means in response to said drop in the voltage below the predetermined level.

4. The combination of claim 1 including voltage supply means for connecting the source of power in parallel to the load and the hold-up circuit means.

5. The combination of claim 4 wherein the power storage means comprises a capacitor connected by the impedance means to the voltage supply means.

6. The combination of claim 5 wherein said safety means comprises sensing means connected to the voltage supply means for detection of said drop in the voltage below the predetermined level, a switch connected to the capacitor in by-pass relation to the voltage supply means and relay means connected to the sensing means for grounding of the capacitor through said switch to effect said by-pass of the load in response to said detection of the drop in the voltage below the predetermined level.

7. The combination of claim 6 wherein said sensing means comprises opto-isolator means connected to the voltage supply means for energizing the relay means to prevent said grounding of the capacitor through the switch and zener diode means connected in series with the opto-isolator means to the voltage supply means for deenergizing the relay means in response to said drop in the voltage below the predetermined level.

8. In combination with a source of power and an electrical load connected to the source for operation at an operating voltage above a predetermined level, hold-up circuit means for maintaining said operation of the load during momentary interruption in power of the source, comprising: power storage means connected to the load for supply of said operating voltage thereto, impedance means connected to the power storage means for regulating charge thereof and discharge thereof into the load during said interruption in power of the source and safety means responsive to a drop in voltage from the source below said predetermined level for preventing continuation of said discharge of the power storage means into the load during said interruption in power of the source, said safety means comprising: relay means connected to the storage means for preventing by-pass of the load during said discharge of the power storage means, opto-isolator means connected to the source for energizing the relay means to enable said regulated charge of the power storage means and zener diode means connected in series with the opto-isolator means to the source for deenergizing the relay means in response to said drop in the voltage below the predetermined level.

9. In combination with a power source and an electrical load connected to said power source at a terminal to which DC voltage at an operating level is applied, hold-up circuit means including: a storage capacitor, impedance means operatively connecting said terminal to the storage capacitor for discharge thereof into the load during interruption in power from the source at said operating voltage level, relay means for controlling said discharge of the storage capacitor during said interruption in power and relay deenergizing means responsive to a drop in the DC voltage applied to said terminal below a predetermined level preventing continuation of said discharge of the capacitor into the load by grounding of the capacitor.

10. The combination of claim 9 wherein said relay deenergizing means includes an opto-isolator and a zener diode connected in series therewith to the power source.

11. The combination of claim 10 wherein said impedance means includes a diode interconnected between the terminal and the storage capacitor and a resistor connected to the power source in parallel with the diode to charge the capacitor during operation of the load by the power source.

12. The combination of claim 9 wherein said impedance means includes a diode interconnected between the terminal and the storage capacitor and a resistor connected to the power source in parallel with the diode to charge the capacitor during operation of the load by the power source.

* * * * *